(12) United States Patent
Bode

(10) Patent No.: US 10,494,005 B2
(45) Date of Patent: Dec. 3, 2019

(54) ROLLING LEVER DUMBBELL HANDCART

(71) Applicant: Roberto Manuel-German Bode, Evanston, IL (US)

(72) Inventor: Roberto Manuel-German Bode, Evanston, IL (US)

(*) Notice: Subject to any disclaimer, the term of this patent is extended or adjusted under 35 U.S.C. 154(b) by 82 days.

(21) Appl. No.: 15/642,036

(22) Filed: Jul. 5, 2017

(65) Prior Publication Data

US 2018/0148078 A1 May 31, 2018

Related U.S. Application Data

(60) Provisional application No. 62/426,994, filed on Nov. 28, 2016.

(51) Int. Cl.
*B62B 1/22* (2006.01)

(52) U.S. Cl.
CPC ............ *B62B 1/22* (2013.01); *B62B 2203/04* (2013.01)

(58) Field of Classification Search
CPC .. B62B 1/22; B62B 1/16; B62B 1/142; B62B 1/24; B62B 1/264; B62B 1/12; B62B 1/26; B62B 1/06; B62B 1/10; B62B 2202/10; B62B 2202/02; B62B 2202/20; B62B 2202/41; B62B 2203/04; B62B 2203/02; B62B 2203/42; B62B 2203/10; B62B 2203/13; B62B 3/0625; B62B 3/0606; B62B 5/0089; B65F 1/1452; F41A 9/87
See application file for complete search history.

(56) References Cited

U.S. PATENT DOCUMENTS

| | | | | |
|---|---|---|---|---|
| 251,194 A * | 12/1881 | Cushing | .................... | B60P 1/14 414/469 |
| 1,255,484 A * | 2/1918 | Stephens | ................. | B62B 1/264 248/129 |
| 1,774,791 A * | 9/1930 | Dunbeck | ................... | B62B 1/22 414/459 |
| 2,800,235 A * | 7/1957 | Reich | ........................ | B62B 1/14 280/47.27 |
| 3,335,766 A * | 8/1967 | Winger | .................... | B60S 5/043 137/355.12 |
| 4,281,957 A * | 8/1981 | Vishe | ........................ | F41A 9/87 414/457 |
| 4,981,412 A | 1/1991 | Hawkins | | |
| 5,160,154 A | 11/1992 | Seydel et al. | | |
| 5,316,248 A * | 5/1994 | Allen | ........................ | B62B 1/16 248/129 |
| 5,593,271 A * | 1/1997 | Hall | ........................ | B62B 1/12 280/43 |
| 5,674,002 A | 10/1997 | Powell | | |
| 8,360,474 B2 | 1/2013 | Lurie | | |

(Continued)

*Primary Examiner* — Glenn F Myers

(57) ABSTRACT

The Rolling Lever Dumbbell Handcart is a machine that is organized with a curved front structure that creates a varying effective fulcrum for lifting dumbbells. This machine solves the repeated strain problem associated with having to lift a dumbbell up to a necessary height. The operation of this machine works by having the operator lean the entire handcart forward so that the front curved portion rolls forward upon the flooring. The Dumbbell is then secured and the same rolling motion is performed in the reverse direction. Once the Handcart is lifted to its upright position it can then be rolled to another location where it can then be leaned forward again to place the Dumbbell in a new location.

8 Claims, 4 Drawing Sheets

(56) References Cited

U.S. PATENT DOCUMENTS 9,550,506 B2    1/2017   Nikora
2008/0109957 A1*   5/2008   Blancke .................... B62B 3/10
                                                                     4/661

* cited by examiner

ROLLING LEVER DUMBBELL HANDCART

FIELD OF INVENTION

The present invention is a handcart which reduces the amount of lifting force needed to lift objects and transport them by mechanical means.

BACKGROUND OF INVENTION

The present invention is a machine that can be utilized by the user to lift and transport heavy objects. Similar machines can go by names such as hand-truck, handcart and dolly, but do not typically lift their respective cargos in the same way as the Rolling Lever Dumbbell Handcart which both acts as a transporter of the cargo and lift. The problem of lifting heavy objects is often the source of injury and strain, especially in cases where the body of the person may not be acclimated to lifting the given amount of weight. Athletic gyms often have employees that must lift several dumbbells in a day to prevent tripping safety hazards on the premises. Because the rack for the weights is at a higher position than the floor, the employee must to lift the weight up to different heights for each dumbbell, each time they complete this routine.

This process of having to lift weights that can be over one hundred pounds, can be strenuous to the employee possibly causing injury. This Rolling Lever Dumbbell Handcart decreases the possibility of injury to the user from repeatedly lifting heavy dumbbells, by reducing the amount of lift force that the user would have to exert to lift the dumbbell, carry it and place it in a final location. Another added benefit to the Rolling Lever Dumbbell Handcart is that it utilizes no external power sources, and is of simple durable design which can be easily operated by one person, making it ideally structured for the athletic gym environment.

SUMMARY OF INVENTION

The invention disclosed is a hand operated wheeled cart that is specifically shaped to utilize mechanical advantage in the lifting of dumbbells to a given height for transport and placement. The name of the invention is the Rolling Lever Dumbbell Handcart, but will be referred to in the rest of the specification as a handcart. This written description begins with the handcart on a floor, oriented so that it is standing up with its top user handle farthest from the ground and the lowest portion of the handcart in contact with the ground. This axis directly between and connecting the upper portion user handle and the lower portion wheeled base, will be called vertical axis.

The handcart frame can be constructed of any hard material of suitable strength such as metal, plastic, wood or other high strength materials, though a lightweight material is desirable to reduce needed lift force. The wheels are located on the rear section of the handcart just behind the lowest portion of the handcart raised above the ground, so that when the lowest portion of the handcart frame is touching the ground in an upright orientation the wheels will not be touching the ground. The lowest portion of the handcart frame can also be called the secondary fulcrum, and will have suitable friction material such as a rubber covering for frictional contact to prevent slippage. The wheels can be attached with a suitable one way bearing system to allow for rotation in one direction for forward handcart travel only, and then fixedly attached to the handcart in said location behind the lowest portion toward the rear of the base.

The front portion of the frame that is bent will extend forward and upward in an arced shape, beginning at the lowest portion of the handcart on the bottom of the base and will end at some distance in front of the handcart, at a desired height at or near the midway point of the vertical axis. The curvature of the bent portion should be in a way that the center of curvature for the bent portion is located somewhere to the rear of the handcart to create desired amount of curvature. The bent portion shape is so that the effective fulcrum of the handcart when lifting a dumbbell travels down along the vertical axis, creating variable level arms to the upper lift handle and the dumbbell securing mechanism, to lift the given weight. The actual fulcrum changes its position depending on where along the transition of the handcart is from its lowered position to its upright position due to variable contact with the ground along the bent portion of the frame.

When the handcart is in its horizontal lowered position the length of the user's input lever arm is from the upper handle to an effective fulcrum along the vertical axis above the highest point of the front bent portion, and the output lever arm is from the effective fulcrum to the lift arm. Because the input user lever arm is already longer in length than the output lever arm to the lift arm holding the dumbbell, there is already mechanical advantage in the system that will lessen the amount of force needed to be applied to lift the dumbbell. As the user pulls up on the upper handle, the user input lever arm increases in length because of new points of contact between the front bent portion and the ground causing the effective fulcrum located on the vertical axis to move toward the secondary fulcrum at the base. Consequently, the output lever arm for the lift arm lifting the dumbbell will increase as well, causing less mechanical advantage. But as the user continues to raise the handcart, the user body position becomes more comfortable to handle the increased force needed. When the handcart is in its upright position, the user's input lever arm of the mechanical system is the length of the handcart from the secondary fulcrum to the user handle, and the output lever arm to the dumbbell is from the secondary fulcrum to the lift arm.

The outer edge of the bent portion of the handcart frame will have a frictional material such as rubber attached to it facing forward to hold the handcart in static frictional contact when the handcart is in the process of leaning forward for lifting or lowering. The front bent portion will then terminate and the frame will continue towards the vertical axis, and continue to extend upward until the upper user handle location. Located above the midway point of the vertical axis will be an elongated piece of frame material called the lift arm structure, said lift arm structure being attached to a means for stably securing the dumbbell in its current position so that it can be lifted by the handcart, and an actuation lever for actuating the securing mechanism. Securing of the dumbbell can be accomplished by a clamping mechanism, latched lifting hook or other suitable means of grabbing and stably securing the dumbbell when the handcart is in use. The elongated lift arm structure with securing mechanism and actuation lever, can be called the lift arm, and will be attached to the to the frame so that it is free to rotate up down for rotational control of the dumbbell when secured.

BEST MODE OF USING INVENTION

The best mode of the invention would have the front bent portion of the Rolling Lever Dumbbell Handcart terminating at a height near midpoint of the total height of the handcart. The center of curvature for the for the front bent portion would be located at a height midway in position relative to the vertical axis, and be a distance far enough behind the handcart to cause the front bent portion of the handcart to extend forward to a distance roughly equivalent to thirty percent the total height of the handcart. The handcart would utilize the latching hook style of securing the dumbbell, the latch being operated to open and closed positions by the actuation lever located on the other side of the lift arm structure by connecting cable. The user will locate a dumbbell that is either at a location on the ground or at a raised location.

When the dumbbell is located on the ground, the user should place the handcart a suitable distance from the dumbbell initially located so that when the handcart is leaned forward causing the front bent portion to roll along the ground, allowing the upper portion of the bend to terminate near the location of the dumbbell. While the handcart is laying on the ground in its lowered position, the user will utilize the latch hooking mechanism to secure the dumbbell for lifting. The user will then pull upward on the user handle located near the upper portion of the handcart utilizing the effective fulcrum and front bent portion. As the user is pulling upward, the dumbbell should be lifted by the contact of the bent portion of the handcart with the ground. The bent portion of the handcart should be in contact with the ground as the user continues to lift the handcart to its upright position. When the handcart has been lifted to its upright position with dumbbell secured, the user will then continue to pull back on the handle causing a rotation about the secondary fulcrum toward the user, to utilize the rear wheels to move the handcart to desired location with the dumbbell secured. Once the user arrives at the desired location, they can lean the handcart forward utilizing the lowest portion of the handcart as a fulcrum and place the dumbbell on a rack or position of greater height than on the ground by resting it on the rack or new position and actuating the latching mechanism to free the dumbbell.

For the user to utilize the handcart when the dumbbell is not on the ground, but on an elevated position, they follow the same general steps of operation in reverse. This would mean that the user will hook and secure the dumbbell from a location not on the ground and utilize the lower portion of the handcart as a fulcrum to lift the dumbbell, position the handcart so that the user can use the rear wheels. Move the dumbbell to a desired location and then lean the handcart forward so that the bent portion rolls along the ground, thereafter utilizing the latching mechanism to release the weight on to the ground.

DRAWINGS

FIG. 1 is a frontal view of the handcart showing the front bent portion of the handcart, also containing the designated zones for upper and lower portions.

FIG. 2 is a side view of the handcart from the right side, showing the bent portion facing toward the right of the image, also containing the designated zones for front and rear portions.

FIG. 3 is a perspective view of the handcart from a frontal raised right position.

FIG. 4 is a side view of different positions of the handcart during the action sequence of using it to lift a dumbbell.

Figure 1:
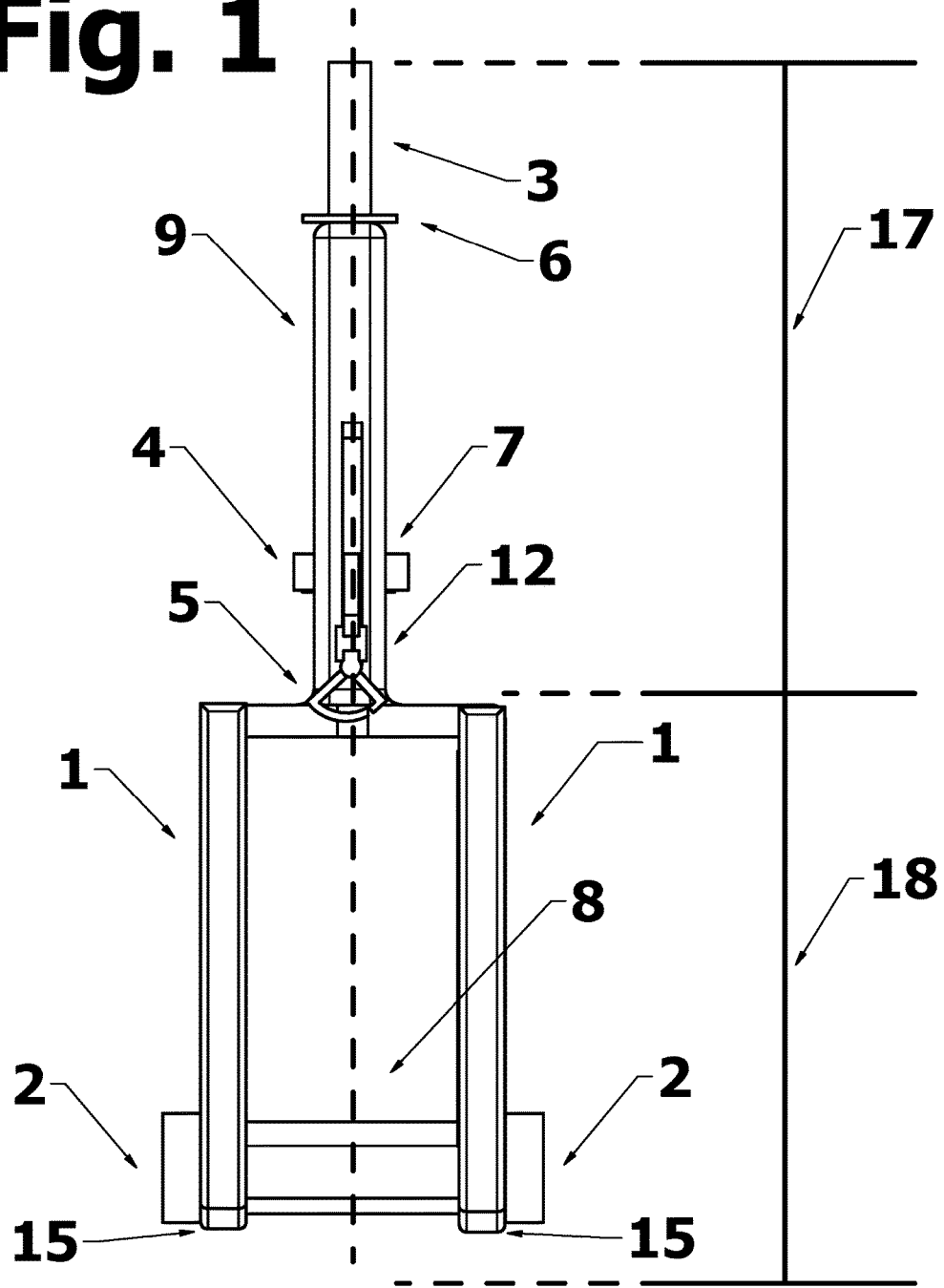
FIG. 1 shows the front bent portion of the handcart 1 that is covered in a rubberized material and can be seen to extend from the secondary fulcrum located at lowest portion of the handcart 15 below the wheels 2, connecting to the frame and continuing to connect with the bent portion of handcart frame. Front bent portion 1 of this figure is the portion of the frame that will contact the ground when lifting the dumbbell. The dumbbell latch hook 5 which can rotate about angle at pivot point 12, is attached to a lift arm structure pivotally attached to the frame at 7 for positioning. The lift arm structure 10 then continues through and behind the handcart to a rear handle 4 that includes a handle for actuation of the dumbbell latch hook 5. This actuation can be conducted by any suitable means such as a cable running along the lift arm structure 10. The handcart frame 9 then continues up along the vertical axis 8 to the handle guard 6 and upper handle 3. This figure also indicates the positioning and extent of the upper portion 17, and the lower portion 18.
Figure 2:
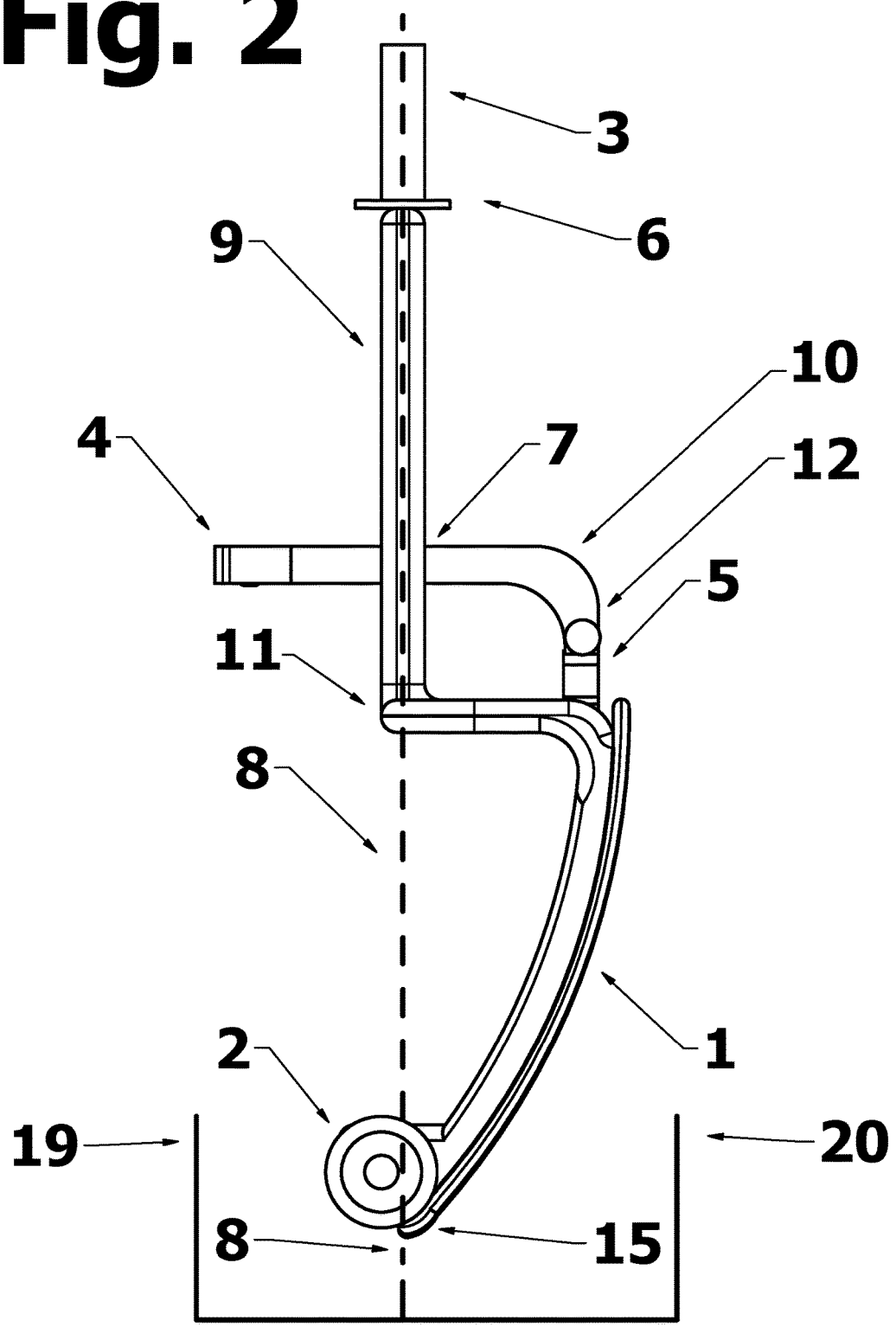
FIG. 2 shows the front bent portion of the frame 1 that is covered in a rubberized material. The front bent portion of the handcart 1 of this figure is the portion of the frame that will contact the ground when lifting the dumbbell from its original position utilizing the latching hook mechanism 5. As the frame continues upward from front bent portion 1 of the handcart, the frame bends backwards to section 11 on the vertical axis 8 and then continues up to frame section 9 of the handcart frame. On the upper section of the frame below frame section 9 is where the lift arm structure 10 will be pivotally connected to the handcart frame. The lift arm latch hook 5 which can freely rotate through angle about pivot point 12, being actuated by the lift arm handle 4. Section 9 of the handcart then continues upward to the handle guard 6 connecting to the upper handle 3. This figure also indicates the position and extent of the rear portion 19, and front portion 20.
Figure 3:
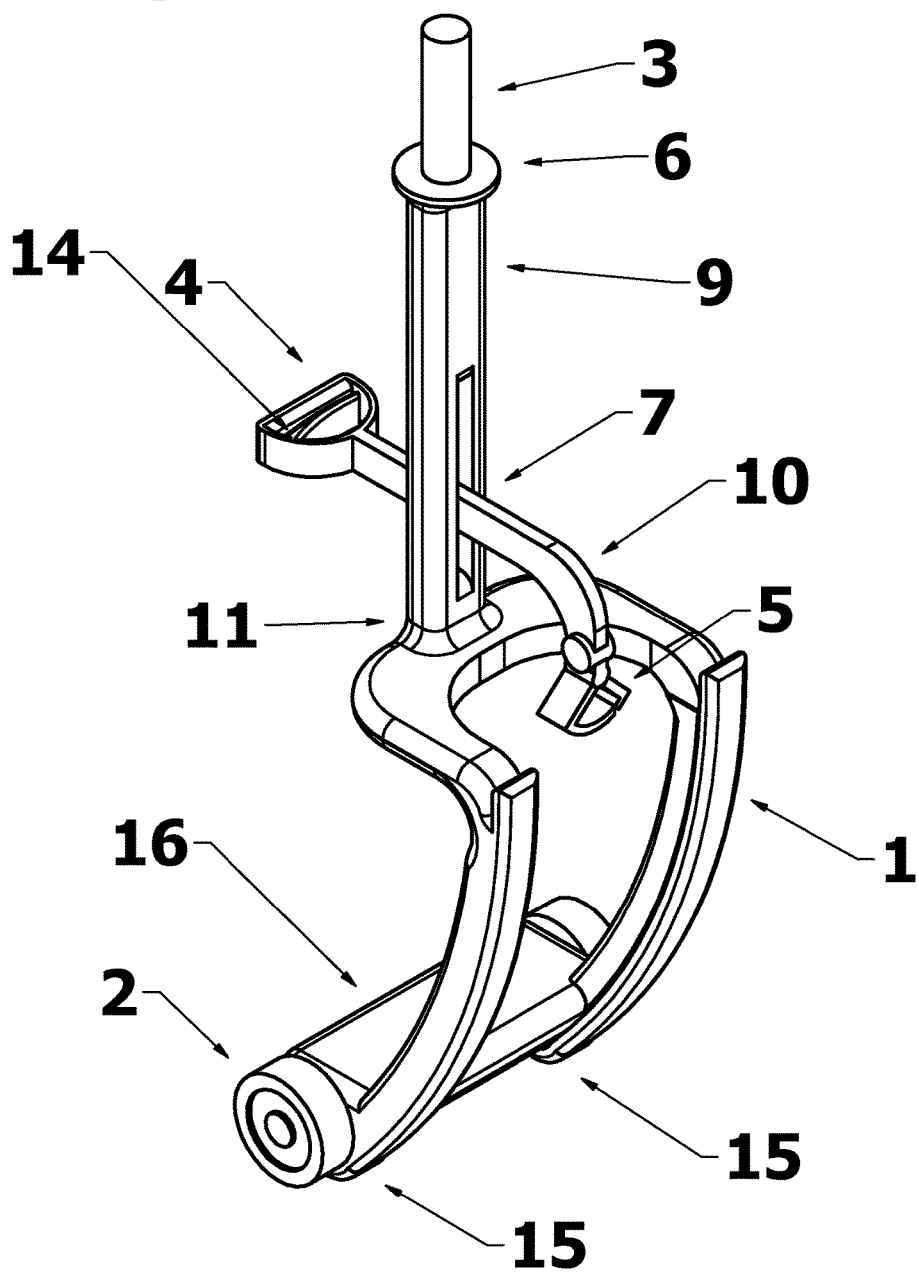
FIG. 3, is the perspective drawing of the invention showing the inside of the lift arm handle 4 so that the actuation initiation lever 14 can be seen. The wheels 2 with ability to roll, are attached to the base 16 located at the bottom of the handcart, so that when the handcart is oriented upright the wheels will not be in contact with the ground. This view shows the characteristically arced angle of the front bent portion 1 which would be rubberized. This bent portion 1 should be progressive in curved arcing to allow for smooth transition from leaned over position to upright position. The bent portion 1 extends to section 11 of the frame, extending through frame section 9 terminating at the user handle guard 6 and handle 3. The lift arm structure 10 is shown, as well as the pivotally attached latch hook mechanism 5 which can be actuated by a cable system or other means contained in the lift arm structure 10 extending to the lift arm handle 4 and actuation initiation lever 14.
Figure 4:
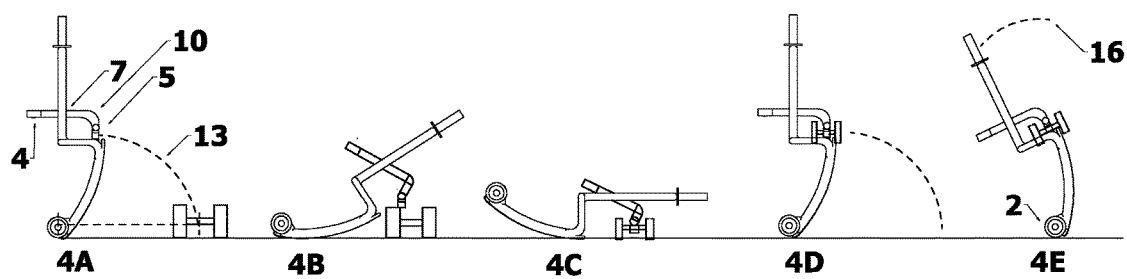
FIG. 4 shows the invention during use. The starting position is the upright position 4A, followed by the leaning forward position 4B along the path of 13, thirdly position 4C is the lowered position whereby the user utilizes the lift arm structure 10 to position and secure the dumbbell with the latching hook 5 actuated by the actuation initiation lever 14. After the dumbbell is secured, the handcart will be lifted to its final position of lift 4D. The user would then normally continue to pull the handcart a short distance 16 to the position in 4E, where the wheels 2 would be used to transport the given dumbbell to another location.

To the extent this Invention description and drawings disclose more subject matter than what is claimed in the single claim written below, that subject matter is not dedicated to the public, and the right to claim that invention in a subsequent application is reserved. Though the claim presented here is narrow, it should be noted that the scope of the invention here is broader than what is claimed. It is intended that any future applications claiming priority from this application may have broader claims submitted.

What is claimed is:

1. A Handcart comprising of:
   (a) a frame constructed of hard material, with a lower portion and upper portion positioned along a vertical axis, and a front portion and rear portion;
   (b) said upper portion of the frame having an opening for pivotally attaching a lift arm structure constructed of a hard material through said upper portion allowing for upward motion of the end of the lift arm containing a dumbbell when user pushes down on a user handle portion, said pivotally attached location not allowing for rotation of lift arm at dumbbell end below lift arm horizontal;
   (c) the lift arm structure containing a means for actuating a pivotally attached gripping section, said gripping section being located at one end of lift arm structure toward the front portion of the handcart, and an actuation initiation lever located at the other end of the lift arm structure to the rear of the handcart;
   (d) the upper portion of frame having a user handle located at the terminal end of the upper portion oriented parallel to and along the vertical axis, at the furthest point from the lower portion of the frame;
   (e) the lower portion of the frame having a base extending axially outward in a first direction that is parallel with a floor and orthogonal to a path of travel and a second direction symmetrically opposed the first direction, the base having a base linear axis extending in the first and second directions, said base linear axis oriented perpendicular to the vertical axis and connected to a front bent portion of the frame, said base having wheels that allow for forward motion, located on both ends of the base linear axis, with the base connected on its front facing side to the front bent portion;
   (f) the front bent portion of the lower portion frame fixedly connected to the base, the front bent portion extending below the wheels when the handcart is in an upright orientation such that the front bent portion contact with the floor occurs in the upright and leaned forward positions and the wheels do not contact the floor in the upright and leaned forward positions, and the front bent portion does not contact the ground when the handcart is leaned toward a user located near the rear portion, said front bent portion extending forward in front of the handcart and toward the upper portion of the handcart in an arced shape, said arced shape having a center of curvature and a radius, the radius extending from an outer front edge of the front bent portion located in front of the vertical axis, to a center of curvature located to the rear of the vertical axis, the front bent portion of the frame having a rubberized covering for frictional contact with ground, said front bent portion having an opening space for the dumbbell between the front bent portion sides, at the highest point of the front bent portion near a height midway of the height of the handcart the front bent portion of the frame will sharply return back to the vertical axis where it will join with the upper portion along the vertical axis.

2. The machine handcart in claim 1 wherein said pivotally attached lift arm has range of rotation between 0 and 5 degrees above a plane parallel with the floor when the handcart is in the upright orientation, and having the gripping section toward the front portion and the actuation lever toward the rear.

3. The handcart of claim 1, wherein the lower portion is constructed of a different material from the upper portion.

4. The handcart of claim 2, wherein the lower portion is constructed of a different material from the upper portion.

5. The handcart of claim 3, wherein the material used for the lower portion is a material having a density greater than the upper portion.

6. The handcart of claim 4, wherein the material used for the lower portion is a material having a density greater than the upper portion.

7. The handcart of claim 1, wherein the gripping section further comprises a latch hook that can be opened and closed by the actuation of the actuation initiation lever.

8. The handcart of claim 5, wherein the gripping section further comprises a latch hook that can be opened and closed by the actuation of the actuation initiation lever.

* * * * *